N. L. Revere
Riding Stirrup.
N° 66,106.   Patented June 25, 1867.
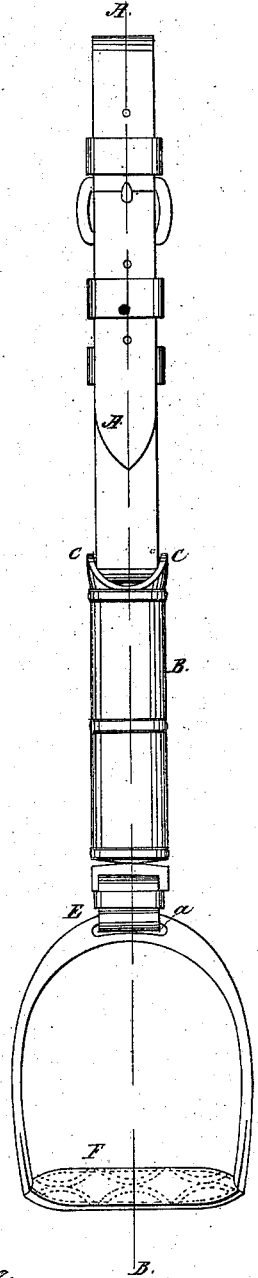
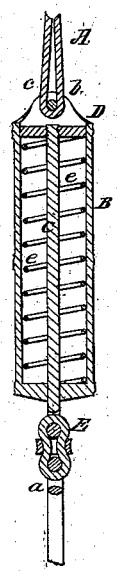
Witnesses:
Thos H Dodge
D L Miller
Inventor:
Nathan L Revere

United States Patent Office.

NATHAN L. REVERE, OF WORCESTER, MASSACHUSETTS.

Letters Patent No. 66,106, dated June 25, 1867.

IMPROVEMENT IN STIRRUPS.

The Schedule referred to in these Letters Patent and making part of the same.

KNOW ALL MEN BY THESE PRESENTS:

That I, NATHAN L. REVERE, of the city and county of Worcester, and Commonwealth of Massachusetts, have invented certain new and useful Improvements in Stirrup Springs for Saddles, of which the following is a full, clear, and exact description, reference being had to the accompanying drawings, forming a part of this specification, in which—

Figure 1 represents a side view of my improved spring; and

Figure 2 represents a longitudinal central section on line A B, fig. 1.

To enable those skilled in the art to which my invention belongs to make and use the same, I will proceed to describe it more in detail.

In the drawings, the part A is the stirrup-strap made in the usual form, but instead of passing through the eye $a$ of the stirrup, as usual, it passes under the pin $b$, which has its bearings in the ears $c\ c$ of the metal case B, the bottom of which is closed excepting a hole in the centre for the passage of the piston-rod C, which is fastened at the top to the piston-head D, and has an eye upon its lower end through which the loop E passes after passing through the eye $a$ of the stirrup, as fully shown in the drawings. Before the piston-head D is fastened to the upper end of the piston-rod C a spiral spring, $e$, is placed in the case B, so that when the parts are all put together for use they will occupy the relative positions shown in the drawings. The piston-head D may be fastened on by riveting, or it may be screwed on. If preferred, the top of the case B may be made with a tight head and the bottom made to screw on or be fastened on in any other manner.

The operation is as follows: When the rider places his foot in the stirrup F the weight or pressure thrown upon the latter comes upon spring C and is communicated through that and the case B to strap A. It will, therefore, be seen that in riding the sudden jarring and jolting of the rider in his saddle does not come directly upon the saddle and horse, as is the case when the ordinary saddles are used, since the spring $e$ receives, breaks up, and equalizes all sudden strains or jars which come upon the stirrup.

By my invention the rider and horse are both relieved from one great source of fatigue incident to the use of a horse under the saddle, while the latter will last much longer than when used as commonly made. The upper end of the strap A is to be attached to the saddle in the ordinary manner.

Having described my improved stirrup spring, what I claim as new and of my invention, and desire to secure by Letters Patent, is—

The combination with the stirrup E and strap A of the case B, (having ears $c\ c$ and a pin, $b$,) spiral spring $e$, piston-rod C, and head D, said parts being constructed and arranged to operate in relation to each other substantially as and for the purpose set forth.

NATHAN L. REVERE.

Witnesses.
   THOS. H. DODGE,
   D. L. MILLER.